United States Patent
Knuth et al.

(10) Patent No.: US 11,487,013 B2
(45) Date of Patent: Nov. 1, 2022

(54) CREATION AND LOADING OF MAPPING DATA ON AUTONOMOUS ROBOTIC DEVICES

(71) Applicant: Diversey, Inc., Fort Mill, SC (US)

(72) Inventors: David M. Knuth, North Chesterfield, VA (US); Philip Hennessy, Midlothian, VA (US); Aurle Gagne, Mechanicsville, VA (US)

(73) Assignee: Diversey, Inc., Fort Mill, SC (US)

( * ) Notice: Subject to any disclaimer, the term of this patent is extended or adjusted under 35 U.S.C. 154(b) by 229 days.

(21) Appl. No.: 16/637,427

(22) PCT Filed: Aug. 8, 2018

(86) PCT No.: PCT/US2018/045781
§ 371 (c)(1),
(2) Date: Feb. 7, 2020

(87) PCT Pub. No.: WO2019/032684
PCT Pub. Date: Feb. 14, 2019

(65) Prior Publication Data
US 2020/0241553 A1    Jul. 30, 2020

Related U.S. Application Data

(60) Provisional application No. 62/542,533, filed on Aug. 8, 2017.

(51) Int. Cl.
*G01S 17/89* (2020.01)
*G05D 1/00* (2006.01)
(Continued)

(52) U.S. Cl.
CPC .......... *G01S 17/89* (2013.01); *G01C 21/3878* (2020.08); *G05D 1/0088* (2013.01);
(Continued)

(58) Field of Classification Search
CPC ....... G01S 17/89; G01S 15/89; G05D 1/0088; G05D 1/0251; G05D 1/0274; G01C 21/32; G01C 21/3878; G01C 21/3863
See application file for complete search history.

(56) References Cited

U.S. PATENT DOCUMENTS 8,423,225 B2    4/2013  Hillman, Jr. et al.
8,532,860 B2    9/2013  Daly
(Continued)

FOREIGN PATENT DOCUMENTS

CN    105796002 A    7/2016

OTHER PUBLICATIONS

Kamarudin, K. et al., "Method to Convert Kinect's 3D Depth Data to a 2D Map for Indoor SLAM", 2013 IEEE 9th International Colloquium on Signal Processing and its Applications, 8-10 Mac. 2013, Kuala Lumpur, Malaysia.
(Continued)

*Primary Examiner* — Abby Y Lin
*Assistant Examiner* — Renee LaRose
(74) *Attorney, Agent, or Firm* — Daniel Moderick, Jr.

(57) ABSTRACT

Systems and methods for generating mapping data for an autonomous vehicle (e.g., robotic devices). The methods include obtaining three-dimensional environmental data of an environment from a distance sensor. The three-dimensional environmental data includes information relating to one or more objects in the environment. The method further includes identifying at least one planar layer of two-dimensional data from the three-dimensional environmental data to be included in mapping data based on one or more characteristics of an autonomous vehicle, generating mapping data comprising the at least one planar layer of two-dimensional data from the three-dimensional environmental
(Continued)

data, and transmitting the mapping data to the autonomous vehicle for use during operation within the environment.

24 Claims, 14 Drawing Sheets

(51) Int. Cl.
    *G05D 1/02*     (2020.01)
    *G01C 21/00*     (2006.01)
(52) U.S. Cl.
    CPC ......... *G05D 1/0251* (2013.01); *G05D 1/0274* (2013.01); *G05D 1/0276* (2013.01)

(56) References Cited

U.S. PATENT DOCUMENTS

| | | | |
|---|---|---|---|
| 8,679,260 B2 | 3/2014 | Hillman, Jr. et al. | |
| 8,958,937 B2 | 2/2015 | Hillman, Jr. et al. | |
| 9,014,848 B2 | 4/2015 | Farlow et al. | |
| 2009/0125175 A1* | 5/2009 | Park | G05D 1/024 |
| | | | 701/28 |
| 2011/0316695 A1 | 12/2011 | Li et al. | |
| 2013/0202197 A1* | 8/2013 | Reeler | G06K 9/00201 |
| | | | 382/154 |
| 2014/0333433 A1 | 11/2014 | Li et al. | |
| 2014/0350839 A1* | 11/2014 | Pack | G05D 1/0214 |
| | | | 701/409 |
| 2015/0168954 A1 | 6/2015 | Hickerson et al. | |
| 2018/0188044 A1 | 7/2018 | Wheeler | |

OTHER PUBLICATIONS

Yin, H. et al., "Mastering Data Complexity for Autonomous Driving with Adaptive Point Clouds for Urban Environments", conference paper, Jun. 2017.

International Search Report and Written Opinion of PCT/US2018/045781 dated Oct. 16, 2018; 12 pages.

* cited by examiner

CREATION AND LOADING OF MAPPING DATA ON AUTONOMOUS ROBOTIC DEVICES

CROSS-REFERENCE TO RELATED APPLICATION

This application is a national stage application of, and claims priority to International Patent Application No. PCT/US2018/045781, filed Aug. 8, 2018, which claims priority to U.S. Provisional Application No. 62/542,533, filed Aug. 8, 2017, the disclosures of which are incorporated herein by reference in their entirety.

BACKGROUND

The present disclosure is in the technical field of autonomous vehicle navigation, particularly navigation of autonomous robotic devices. More particularly, the present disclosure is directed to the creation and loading of mapping data on autonomous robotic devices (e.g., cleaning robots), where the mapping data is usable by the autonomous robotic devices when navigating in environments.

Autonomous robotic devices have the ability to minimize the human effort involved in performing everyday tasks. For example, autonomous robotic devices may be used as cleaning devices to help maintain and clean surfaces, such as hardwood floors, carpets, and the like. While autonomous robotic devices are useful, it can be challenging for autonomous robotic devices to operate in a variety of different locations. Navigation in environments is typically done with the aid of sensors that are on board the autonomous robotic devices. These sensors provide information by which the autonomous vehicle is able to navigate. However, real-time processing of sensor data can be slow, causing the autonomous vehicle to move navigate slowly to allow time for processing of the sensor data.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Systems and methods for generating mapping data for an autonomous vehicle (e.g., robotic devices) are disclosed. In an embodiment, the methods may include obtaining three-dimensional environmental data of an environment from a distance sensor. The three-dimensional environmental data includes information relating to one or more objects in the environment. The methods may further include identifying at least one planar layer of two-dimensional data from the three-dimensional environmental data to be included in mapping data based on one or more characteristics of an autonomous vehicle, generating mapping data comprising the at least one planar layer of two-dimensional data from the three-dimensional environmental data, and transmitting the mapping data to the autonomous vehicle for use during operation within the environment. The autonomous vehicle may be a robotic device (e.g., a cleaning robot). Systems for generating mapping data may include a distance sensor, an autonomous vehicle, and a processing device configured to perform the methods described herein.

In some embodiments, the mapping data may include a plurality of planar layers, each of the plurality of planar layers comprising two-dimensional data identified from the three-dimensional environmental data. Optionally, one or more of the plurality of planar layers may have a data point resolution that is lower than a data point resolution of a corresponding plane of the three-dimensional environmental data.

In certain embodiments, the one or characteristics of the autonomous vehicle may include at least one of the following characteristics: dimensions of the autonomous vehicle, location of one or more sensors on the autonomous vehicle, operational range of the one or more sensors in the autonomous vehicle, amount of memory available in the autonomous vehicle, processing capability of the autonomous vehicle, positions of one or more functional features of autonomous vehicles, or maneuverability of the autonomous vehicle.

In one or more embodiments, identifying the at least one planar layer of two-dimensional data from the three-dimensional environmental data to be included in mapping data may further include identifying the at least one planar layer of two-dimensional data based on one or more characteristics of the environment. Optionally, the one or characteristics of the environment include at least one of the following characteristics: location of one or more objects in the environment, or dimensions of one or more objects in the environment.

In at least one embodiment, the method may also include causing operation of the autonomous vehicle in the environment based at least in part on the mapping data received by the autonomous vehicle.

In an embodiment, the at least one planar layer of two-dimensional data may have a data point resolution that is the same as a data point resolution of a corresponding plane of the three-dimensional environmental data. Alternatively and/or additionally, the at least one planar layer of two-dimensional data may have a data point resolution that is lower than a data point resolution of a corresponding plane of the three-dimensional environmental data. Optionally, the data point resolution of the at least one planar layer may be reduced by creating a plurality of vectors from point data included in the three-dimensional environmental data.

In certain embodiments, the autonomous vehicle may be at a location other than the environment when the mapping data is transmitted to the autonomous vehicle.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
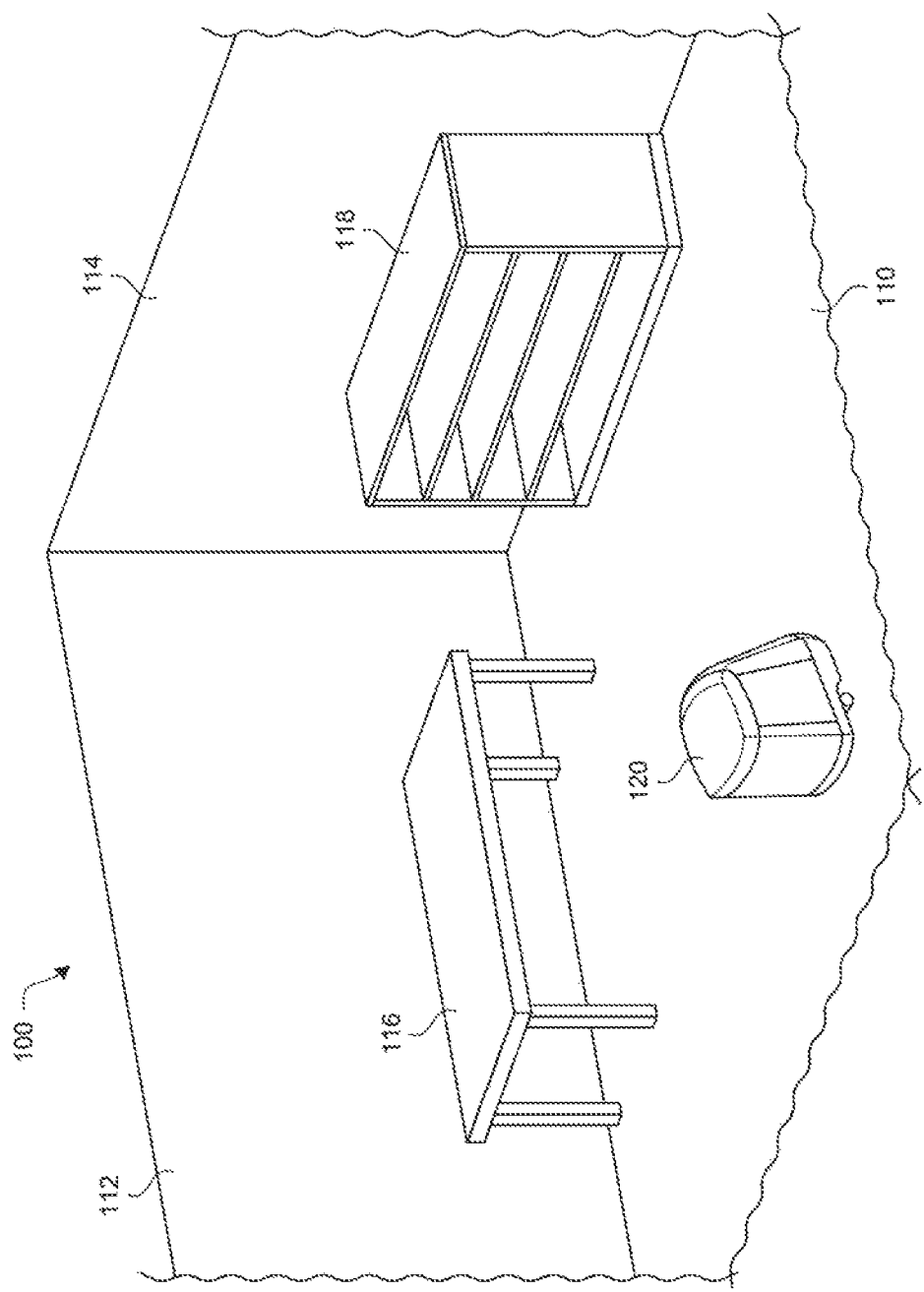
FIG. 1 depicts a perspective view of an environment in which an autonomous vehicle can operate, in accordance with the embodiment described herein.

The present disclosure describes embodiments for the creation and loading of mapping data on autonomous vehicles such as robotic devices for use by the autonomous vehicles when navigating in environments. The mapping data can be generated based on three-dimensional environmental data of the environments in which the autonomous robotic devices are intended to navigate. The autonomous robotic devices can then navigate autonomously within the environments based on the mapping data.

The embodiments disclosed herein can be used to ensure that a skilled user (e.g., a technician of an autonomous vehicle) can obtain the three-dimensional environmental data used to create the mapping data instead of relying on a non-skilled user (e.g., an inexperienced purchaser of the autonomous vehicle) to obtain the three-dimensional environmental data. In particular, the embodiments disclosed herein include methods that allow a user to obtain three-dimensional environmental data of an environment before an autonomous vehicle operates in the environment and/or before the autonomous vehicle is transported to the environment. This enables the skilled user to obtain the three-dimensional environmental data prior to operation of the autonomous vehicle in the environment and/or delivery of the autonomous vehicle to the non-skilled user. The autonomous vehicle is thus completely set up for the intended environment when the non-skilled user receives the autonomous vehicle.

The embodiments disclosed herein also can be used to ensure that the mapping data provided to the autonomous vehicle does not overwhelm the memory and/or processing capabilities of the autonomous vehicle. In particular, sensors that obtain three-dimensional environmental data are frequently capable of gathering large numbers of data points about the environment. These large numbers of data points can take up large amounts of memory and may require significant processing power for the autonomous vehicle to be able to use the data points when navigating in the environment. However, not all autonomous robotic devices have sufficient memory or processing power to handle such large numbers of data points. In some embodiments disclosed herein, the three-dimensional environmental data is provided to a computing device that generates mapping data having a lower data point resolution to be provided to the autonomous vehicle. The autonomous vehicle may have the memory and processing capability to handing the mapping data with a lower data point resolution, while the mapping data with the lower resolution may still include information that allows the autonomous vehicle to properly navigate within the environment.

As used herein, the term "robot" or "robotic device" refers to an electro-mechanical machine guided by a computer or electronic programming. Mobile robotic devices have the capability to move around in their environment and are not fixed to one physical location. An example of a mobile robotic devices that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

Such robotic devices can interact or interface with humans to provide a number of services that range from home assistance to commercial assistance and more. In the example of home assistance, a mobile robotic device can assist elderly people with everyday tasks, including, but not limited to, maintaining a medication regime, mobility assistance, communication assistance (e.g., video conferencing, telecommunications, Internet access, etc.), home or site monitoring (inside and/or outside), person monitoring, and/or providing a personal emergency response system (PERS). For commercial assistance, the mobile robotic device can provide videoconferencing (e.g., in a hospital setting), a point of sale terminal, interactive information/marketing terminal, etc. Mobile robotic devices need to navigate in a robust or reliable manner, for example, to avoid obstacles and reach intended destinations.

The term "three-dimensional environmental data" refers to a set of data (e.g., a 3D point cloud) corresponding to an environment that includes information relating to relative distances, positions, dimensions, etc. of one or more objects in the environment, and obtained using a distance sensor. "Mapping data" refers to a subset of the three-dimensional environment data that includes at least one planar layer of two-dimensional data.

Depicted in FIG. 1 is a perspective view of an example environment 100 in which an autonomous vehicle 120 such as a robotic cleaning device can operate. The environment 100 includes a number of objects. In the depicted embodiment, the environment 100 is in the form of a room that includes a floor 110, a wall 112, and a wall 114. The environment 100 may also include a ceiling, other walls, doors, windows, and the like, which are not depicted in the view shown in FIG. 1. The environment 100 also includes a table 116 located along the wall 112 and shelves 118 located along the wall 114.

In the depiction shown in FIG. 1, the autonomous vehicle 120 is located on the floor 110. The autonomous vehicle 120 is configured to move across the floor 110. In some examples, the autonomous vehicle 120 may be one of a SWINGBOT, an AEROBOT, or a DUOBOT, cleaning robots. In some embodiments, the autonomous vehicle 120 may include a computing device (not shown) that is configured to control the movements of the autonomous vehicle 120 across the floor 110. In some embodiments, the computing device is configured to control the movements of the autonomous vehicle 120 based on, without limitation, readings from one or more sensors on board the autonomous vehicle 120, a digital map of the environment 100 stored in the autonomous vehicle 120, readings from one or more sensors in the environment 100, a predefined path of movement stored in the autonomous vehicle 120, or any other information, or combination thereof.

In some embodiments, sensors on board the autonomous vehicle 120 may be used to generate a digital map of the environment 100, such as in examples described in U.S. Patent Application No. 62/445,850, the contents of which are hereby incorporated by reference in their entirety. While it is possible to create digital maps of the environment 100 using sensors on board the autonomous vehicle 120, that method of creating digital maps may not work in all situations. For example, it would not be possible to pre-load a digital map of the environment 100 onto the autonomous vehicle 120 before the autonomous vehicle 120 is transported to the environment 100 if the sensors on the autonomous vehicle 120 itself are used to generate the digital map. As such, when the autonomous vehicle 120, time and effort must be invested for generating the digital map before the autonomous vehicle 120 can operate in the environment. The current disclosure describes methods for generating and pre-loading desired digital maps in the memory of a robotic device without taking valuable memory space.

Figure 2A:
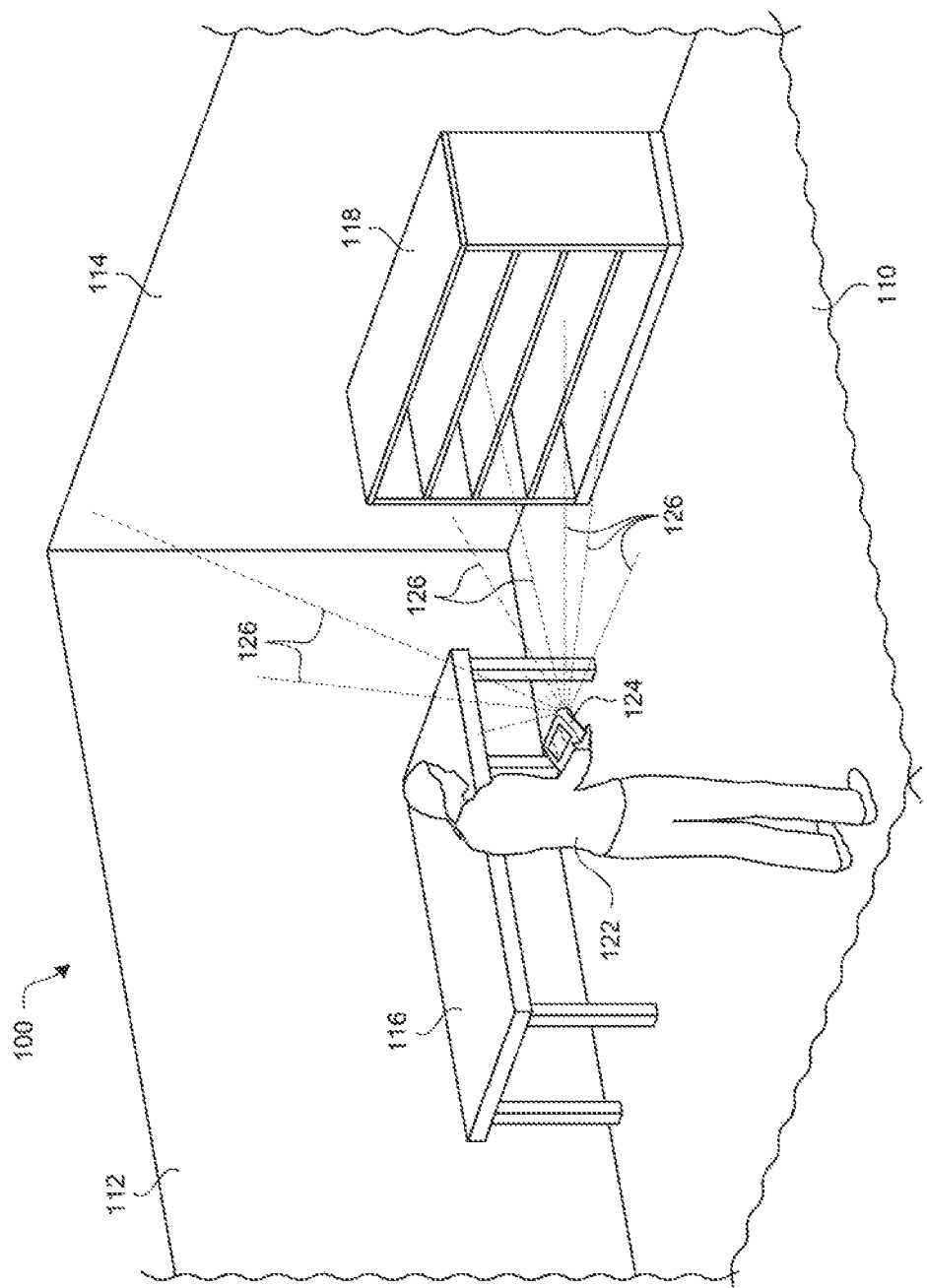
FIG. 2A depicts an embodiment of obtaining three-dimensional environmental data of the environment shown in FIG. 1, in accordance with the embodiment described herein.

Depicted in FIG. 2A illustrates an example embodiment for obtaining three-dimensional environmental data of the environment 100. More specifically, the three-dimensional environmental data may be obtained using a distance sensor 124 deployed in the environment 100. For example, a user 122 is standing in the environment 100 may hold the distance sensor 124 that is configured to determine distances from the distance sensor 124 to objects in the environment 100. Examples of distance sensor 124 may include, without limitation, light detection and ranging (LIDAR) sensors, laser detection and ranging (LADAR) sensors, three-dimensional (3D) imaging/depth map sensors, infrared sensors, ultrasonic sensors, light cameras, stereovision cameras, sonar sensors, radar sensors, or the like. Such sensors may be configured to scan an environment and generate a three-dimensional point cloud corresponding to the environment.

In an embodiment, the distance sensor 124 may emit rays 126 of electromagnetic energy (e.g., infrared electromagnetic energy) toward objects in the environment, such as the floor 110, the walls 112 and 114, the table 116, and the shelves 118. The distance sensor 124 is capable of detecting a distance that each of the rays 126 travels before impacting a surface of an object. The distance sensor 124 stores three-dimensional point data associated with each location impacted by one of the rays 126. The distance sensor 124 is capable of emitting the rays 126 in different directions over time (e.g., by rotating one of more emitters of the electromagnetic energy. The user 122 may hold the distance sensor 124 and walk through the environment 100 to gather three-dimensional environmental data in the form of point data. As the user 122 walks through the environment 100, the distance sensor 124 aggregates the point data sensed over time to build three-dimensional environmental data. One example of the distance sensor 124 is the Contour® hand-held mapping device produced by Kaarta, Inc. of Pittsburgh, Pa. Additionally and/or alternatively, the distance sensor 124 may be mounted on a robotic device.

Figure 2B:
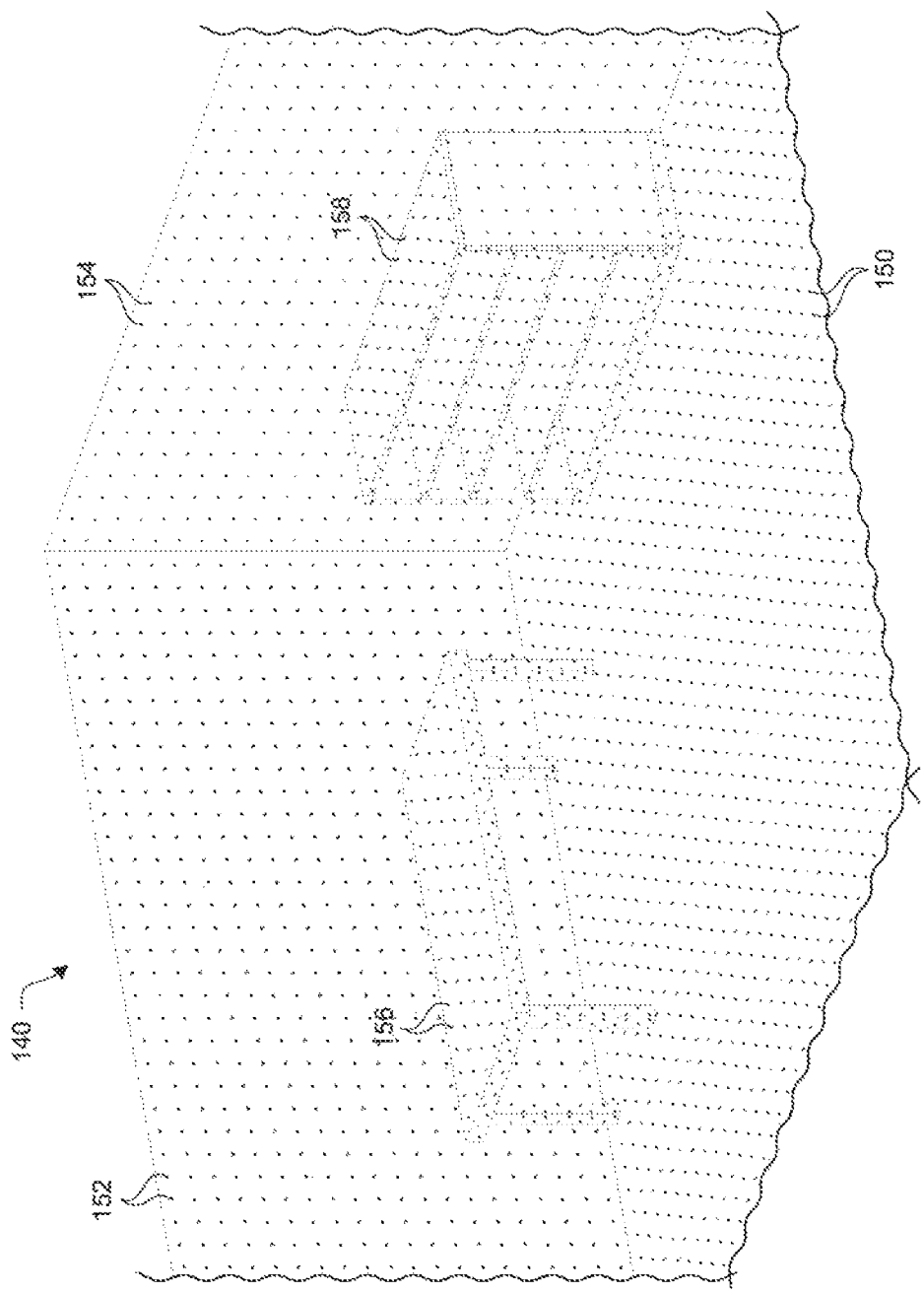
FIG. 2B depicts an embodiment of three-dimensional environmental data of the environment shown in FIG. 1 obtained by the distance sensor shown in FIG. 2A, in accordance with the embodiment described herein.

Referring now to FIG. 2B, an example of three-dimensional environmental data 140 of the environment 100 obtained by the distance sensor 124 is illustrated. As shown in FIG. 2B, the three-dimensional environmental data 140 includes data points 150 from the rays 126 that impinged on the floor 110, data points 152 from the rays 126 that impinged on the wall 112, data points 154 from the rays 126 that impinged on the wall 114, data points 156 from the rays 126 that impinged on the table 116, and data points 158 from the rays 126 that impinged on the shelves 118. The image depicted in FIG. 2B shows dashed lines to indicate the edges of the floor 110, the walls 112 and 114, the table 116, and the shelves 118; however, those dashed lines do not necessarily make up a portion of the three-dimensional environmental data 140. While FIG. 2B shows that the lead lines indicating the data points 150, 152, 154, 156, and 158 point to only a few of the data points, the data points 150, 152, 154, 156, and 158, as used herein, indicate all of the data points from impingement of the rays 126 on the floor 110, the walls 112 and 114, the table 116, and the shelves 118, respectively.

The three-dimensional environmental data 140 obtained using the distance sensor 124 can be used by the autonomous vehicle 120 as an aid when navigating through the environment 100 (for example, during cleaning the environment 100 if the autonomous vehicle 120 is a robotic cleaner). For example, if the three-dimensional environmental data 140 has been pre-loaded on the autonomous vehicle 120 prior to deployment in the environment (e.g., the instance depicted in FIG. 1), the autonomous vehicle 120 can move across the floor 110 of the environment 100 and avoid colliding into the walls 112 and 114, the table 116, and/or the shelves 118 based in part on the three-dimensional environmental data 140. The autonomous vehicle 120 may also navigate within the environment 100 based at least in part on a combination of the three-dimensional environmental data 140 and readings from one or more sensors on board the autonomous vehicle 120 as it moves through the environment 100.

Figure 3A:
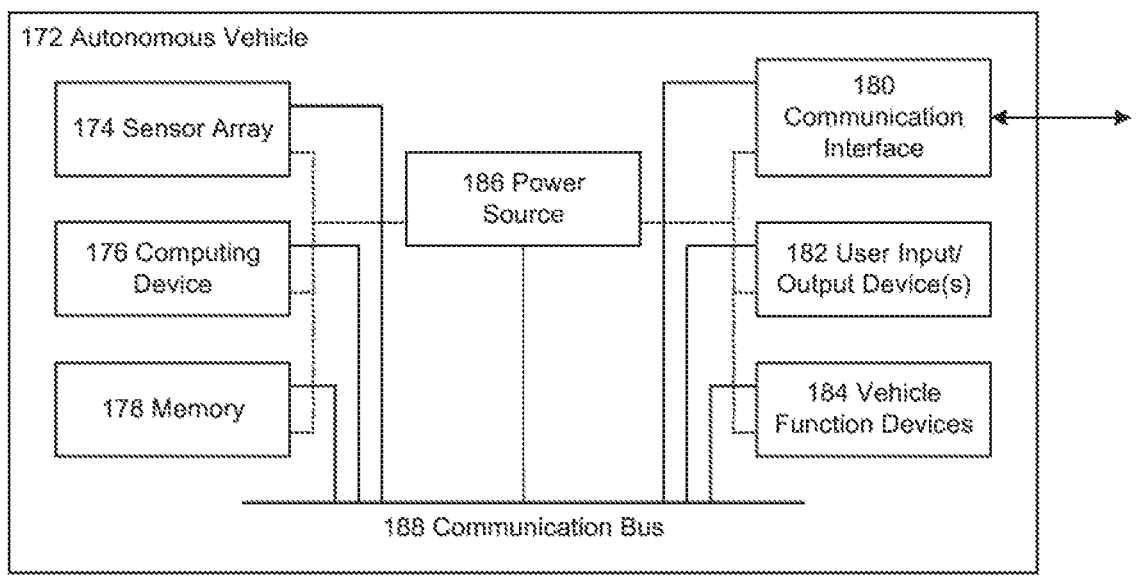
FIG. 3A depicts a block diagram of an embodiment of an autonomous vehicle, in accordance with the embodiment described herein.

Depicted in FIG. 3A is a block diagram of an embodiment of an autonomous vehicle 172. The components and interaction of components described with respect to the autonomous vehicle 172 may be implemented in any other embodiments of autonomous vehicles, including the autonomous vehicle 120. In addition, the embodiments of autonomous vehicles described herein are also not limited to the components and interaction of components described with respect to the autonomous vehicle 172, but can be implemented in a number of other ways.

The autonomous vehicle 172 includes a sensor array 174. The sensor array 174 includes one or more sensors located on the autonomous vehicle 172 that are configured to provide information about the autonomous vehicle 172 itself or the environment around the autonomous vehicle 172. For example, the sensor array 174 may include a proximity sensor configured to detect a distance from the autonomous vehicle to any object in a field of the proximity sensor. Examples of proximity sensors include infrared sensors, LIDAR sensors, global positioning system (GPS) devices, cameras, other electromagnetic energy sensors, sonar sensor, other forms of acoustic sensors, and other forms of proximity sensors. The sensor array 174 may also include sensors to detect an orientation of the autonomous vehicle 172, such as a gyroscope or a compass, or to detect a speed and/or acceleration of the autonomous vehicle 172, such as an accelerometer. The sensor array 174 may also include sensors that detect characteristics about the environment around the autonomous vehicle 172, such as a temperature sensor (e.g., a thermocouple or a thermistor), a humidity sensor (e.g., a hygrometer), a pressure sensor (e.g., a barometer, a piezoelectric sensor), infrared (IR) sensor, or any other sensor.

The autonomous vehicle 172 also includes a computing device 176. In some embodiments, the computing device 176 is configured to receive signals from the sensor array 174. In some embodiments, the computing device 176 is configured to control functions of the autonomous vehicle 172. The autonomous vehicle 172 also includes memory 178 and the computing device 176 is capable of writing information to and reading information from the memory 178. In one particular embodiment, three-dimensional environmental data and/or mapping data may be written to the memory 178 and the computing device 176 may read the data from the memory 178 to aid in controlling movements of the autonomous vehicle.

The autonomous vehicle 172 also includes a communications interface 180 configured to facilitate communication of data into and out of the autonomous vehicle 172. In some embodiments, the communications interface 180 includes one or more of a WiFi transceiver, a Bluetooth transceiver, an Ethernet port, a USB port, or any other type of wired and/or wireless communication interfaces. The communications interface 180 is configured to transmit data to and receive data from computing devices and/or networks that are not included in the autonomous vehicle 172.

The autonomous vehicle 172 also includes one or more user input/output devices 182. The one or more user input/output devices 182 may include any type of input and/or output devices that permit a user input commands into or receive information from the autonomous vehicle 172. In some embodiments, the user input/output devices 182 include one or more of a push button, a toggle switch, a touchscreen display, an LED light, a microphone, a speaker, or any other input and/or output device. The user input/output devices 182 may permit a user to control operation of the autonomous vehicle 172, define settings of the autonomous vehicle 172, receive information about the autonomous vehicle 172, troubleshoot problems with the autonomous vehicle 172, and the like.

The autonomous vehicle 172 also includes vehicle functional devices 184. The vehicle functional devices 184 include any device that is capable of causing the autonomous vehicle 172 to function in a particular way. In some embodiments, the vehicle functional devices 184 include one or more motors that drive wheels of the autonomous vehicle 172 to cause it to move. In some embodiments, the vehicle functional devices 184 include a steering mechanism to control a direction of movement of the autonomous vehicle 172. In some embodiments, the vehicle functional devices 184 include a floor sweeper configured to sweep the floor on which the autonomous vehicle 172 moves. In some embodiments, the vehicle functional devices 184 include a floor polisher configured to polish the floor on which the autonomous vehicle 172 moves. In some embodiments, the vehicle functional devices 184 include a vacuum configured to vacuum the floor on which the autonomous vehicle 172 moves. The vehicle functional devices 184 can include any number of other functional devices that cause the autonomous vehicle 172 to function. In some embodiments, the computing device 176 is configured to control operation of the vehicle functional devices 184.

The autonomous vehicle 172 also includes a power source 186. The power source 186 is configured to provide power to the other components of the autonomous vehicle 172. As shown by the dashed lines in the depiction shown in FIG. 3A, the power source 186 is coupled to and capable of providing power to each of the one or more sensor array 174, the computing device 176, the memory 178, the communications interface 180, the user input/output devices 182, and the vehicle function devices 184. The power source 186 may include one or more of a rechargeable battery, a non-rechargeable battery, a solar cell panel, an internal combustion engine, a chemical reaction power generator, or any other device configured to provide power to the autonomous vehicle 172 and its components.

The computing device 176 is configured to communicate with each of the other components of the autonomous vehicle 172. In the depicted embodiment, each of the sensor array 174, the computing device 176, the memory 178, the communications interface 180, the user input/output devices 182, the vehicle function devices 184, and the power source 186 is in communication with a communication bus 188. The communication bus 188 permits communication of data, instructions, commands, and the like between any of the components of the autonomous vehicle 172. In one example, the computing device 176 can write data to the communication bus 188 for the communications interface 180 to transmit to a remote computing device. In another example, the sensor array 174 can write data to the communication bus 188 to be read by the computing device 176.

Figure 3B:
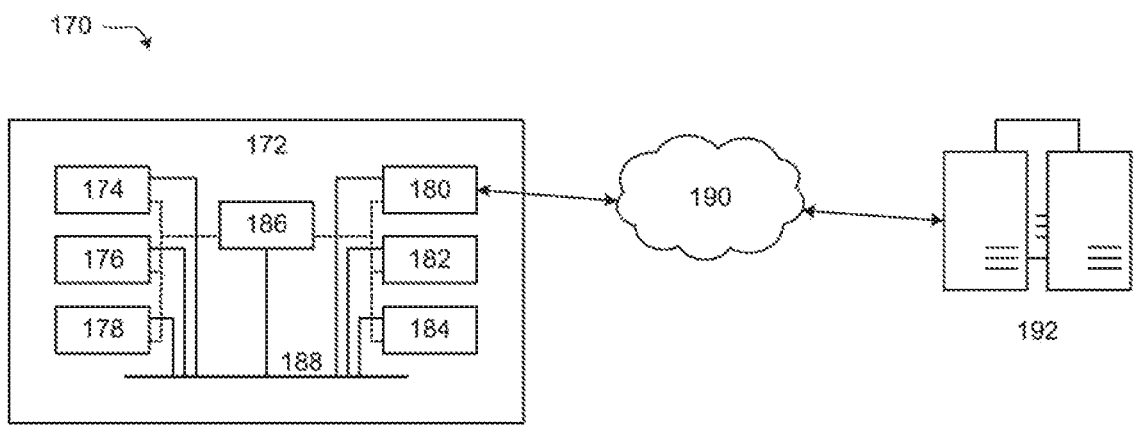
FIG. 3B depicts an embodiment of a system that includes the autonomous vehicle shown in FIG. 3A, in accordance with the embodiment described herein.

Depicted in FIG. 3B is an embodiment of a system 170 that includes the autonomous vehicle 172. The system includes a network 190 that is in communication with the communications interface 180 of the autonomous vehicle 172. The network 190 may include a wireless network, a wired network, or any combination of wired and/or wireless networks. The system 170 also includes a remote computing device 192 that is located remotely from the autonomous vehicle 172 and is in communication with the network 190. In some embodiments, the remote computing device 192 includes a laptop computer, a desktop computer, a server, or any other type of computing device. In some embodiments, the autonomous vehicle 172 operates in a facility (e.g., a building, a campus of buildings, etc.), the network 190 includes a private network to the facility (e.g., a WiFi network associated with the facility), and the remote computing device 192 is a computing device located in the facility at a location different from the operation of the autonomous vehicle 172. In some embodiments, the autonomous vehicle 172 operates in a facility, the network 190 includes a public network (e.g., the Internet), and the remote computing device 192 is located somewhere other than the facility (e.g., in a "cloud" data center, in a facility of a distributor of the autonomous vehicle 172, etc.). It will be understood that many other arrangements of the network 190 and the remote computing device 192 are possible. It will be understood that the remote computing device 192 may be a single computing device or may be a number of computing devices that are capable of interacting with each other.

As noted above, the three-dimensional environmental data 140 can be loaded on the autonomous vehicle 120 and then used by the autonomous vehicle 120 as an aid when navigating through the environment 100. Issues with the use of the complete set of three-dimensional environmental data 140 can include the amount of memory needed to store the three-dimensional environmental data 140 and the computational resources needed to process the three-dimensional environmental data 140 in order for the autonomous vehicle 120 to use the three-dimensional environmental data 140 when navigating through the environment 100. For example, the three-dimensional environmental data 140 may occupy more space that is available in memory on board the autonomous vehicle 120 (e.g., memory 178). In another example, a computing device on board the autonomous vehicle 120 (e.g., computing device 176) may not have the ability to process all of the three-dimensional environmental data 140 in real time as the autonomous vehicle 120 moves through the environment 100.

Figure 4:
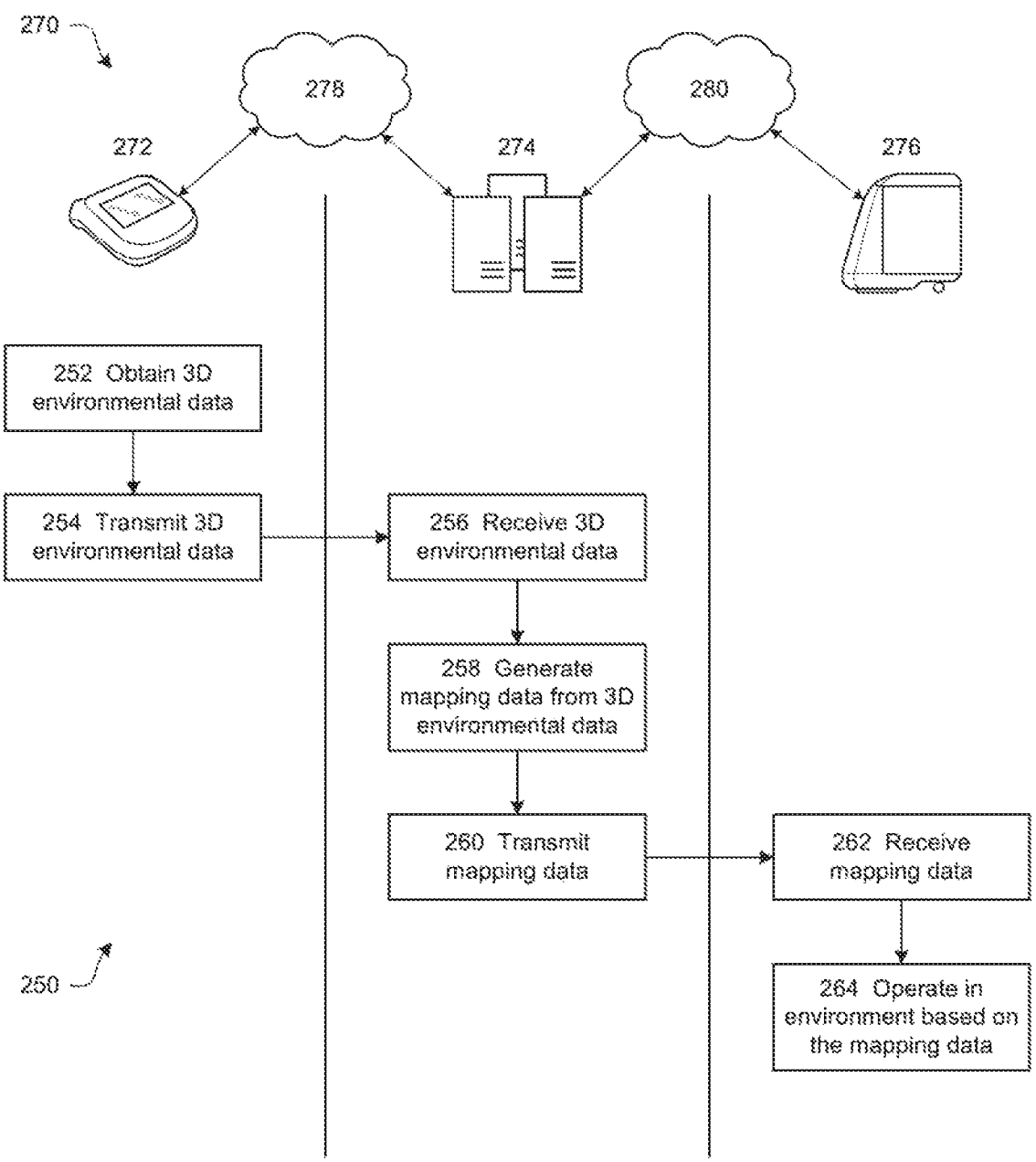
FIG. 4 depicts embodiments of a system and a method of loading mapping data onto an autonomous vehicle for use in navigating in an environment, in accordance with the embodiment described herein.

Depicted in FIG. 4 are embodiments of a system 270 and a method 250 of loading mapping data onto an autonomous vehicle for use in navigating in an environment. The system 270 includes a distance sensor 272, a computing device 274, and an autonomous vehicle 276. It will be understood that the computing device 274 can be a single computing device or any number of computing devices operating together. In certain embodiments, the computing device 274 may be included in the distance sensor 272, or vice versa. The distance sensor 272 is communicatively coupled to the computing device 274 via a network 278. The computing device 274 is communicatively coupled to the autonomous vehicle 276 via a network 280. In some embodiments, the networks 278 and 280 are different networks (e.g., two different private networks), the same networks (e.g., the internet), or some combination of the same and different networks (e.g., network 278 is a combination of one private network and the internet and network 280 is a combination of another private network and the internet). In some embodiments, the networks 278 and 280 are public networks, private networks, or some combination of public and private networks. In some embodiments, the networks 278 and 280 are wired networks, wireless networks, or some combination of wired and wireless networks. In some embodiments, one or both of the networks 278 and 280 includes a direct connection, such as a serial connection (e.g., a USB connection), a paired connection (e.g., a Bluetooth connection or a near field communication (NFC) connection), or any other type of direct connection.

The method 250 is depicted below the system 270 with the steps performed by each of the distance sensor 272, the computing device 274, and the autonomous vehicle 276 depicted below the respective one of the distance sensor 272, the computing device 274, and the autonomous vehicle 276. At block 252, the distance sensor 272 obtains three-dimensional environmental data of the environment. In some embodiments, the three-dimensional environmental data includes information indicative of objects in the environment. For example, the three-dimensional environmental data may include three-dimensional point data indicative of points on surfaces of the objects within the environment that are detected by the distance sensor 272. In some embodiments, the distance sensor 272 is a handheld device that obtains the three-dimensional environmental data using, for example, a LIDAR sensor (for example, as a user walks through the environment while holding the distance sensor 272).

At block 254, the distance sensor 272 transmits the three-dimensional environmental data to the computing device 274 via the network 278. At block 256, the computing device 274 receives the three-dimensional environmental data from the distance sensor 272 via the network 278. As noted above, the network 278 may represent one or more of a wired network, a wireless network, a private network, a public network, a direct connection, or some combination thereof.

At block 258, the computing device 274 generates mapping data from the three-dimensional environmental data received from the distance sensor 272, based on one or more characteristics of an autonomous vehicle to which the mapping data will be transmitted and/or the environment (as discussed below). In some embodiments, the mapping data includes at least one planar layer of two-dimensional data identified from the three-dimensional environmental data. In some examples, the planar layer of two-dimensional data is identified from the three-dimensional environmental data by including the point data located in a single planar layer of the three-dimensional environmental data. In other examples, the planar layer of two-dimensional data is identified from the three-dimensional environmental data by including information in the mapping data that is derived from the point data located in a single planar layer of the three-dimensional environmental data.

In some embodiments, as will be discussed in examples below, the planar layer of two-dimensional data has a data point resolution that is lower than a data point resolution of a corresponding plane of the three-dimensional environmental data. In some embodiments, as will be discussed in examples below, the mapping data includes a number of planar layers and each of the planar layers includes two-dimensional data identified from the three-dimensional environmental data. In some embodiments, where the mapping data includes a number of planar layers, each of the planar layers has a data point resolution that is lower than a data point resolution of a corresponding plane of the three-dimensional environmental data.

At block 260, the computing device 274 transmits the mapping data to the autonomous vehicle 276 via the network 280. At block 262, the autonomous vehicle 276 receives the mapping data from the computing device 274 via the network 280. As noted above, the network 280 may represent one or more of a wired network, a wireless network, a private network, a public network, a direct connection, or some combination thereof. At block 264, the autonomous vehicle 276 operates in the environment based at least in part on the mapping data received from the computing device 274. In some embodiments, the autonomous vehicle 276 is configured to avoid objects in the environment based on information in the mapping data.

One benefit to the system 270 and the method 250 depicted in FIG. 4 is that the autonomous vehicle 276 does not need to be in the environment when the three-dimensional environmental data is generated, when the mapping data is generated, and/or when the mapping data is transmitted to the autonomous vehicle 276 at block 260 and/or received by the autonomous vehicle 276 at block 262. In some embodiments, the autonomous vehicle 276 is at a location other than the environment when the three-dimensional environmental data is generated, when the mapping data is generated, and/or when the mapping data is transmitted from the computing device 274 to the autonomous vehicle 276 at blocks 260 and 262. In these embodiments, the method 250 may also include a step of transporting the autonomous vehicle 276 from the location other than the environment to the environment after the mapping data is transmitted from the computing device 274 to the autonomous vehicle 276. In other embodiments, the autonomous vehicle 276 is in the environment when the mapping data is transmitted from the computing device 274 to the autonomous vehicle 276.

Figure 5:
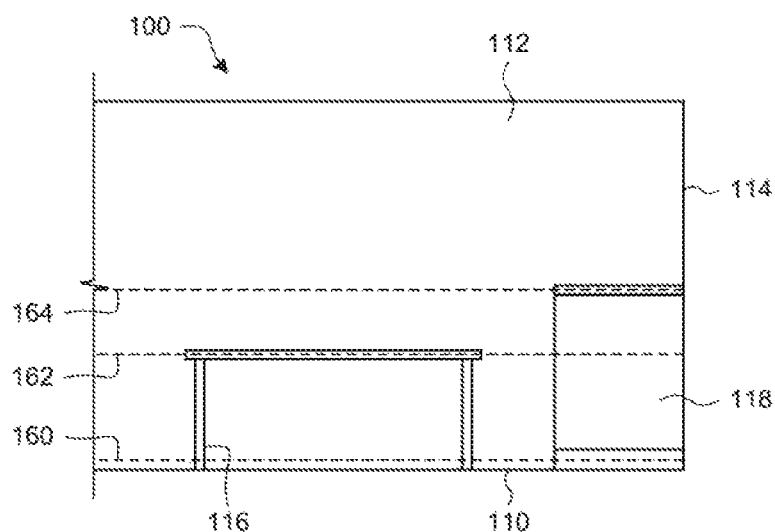
FIG. 5 depicts a side view of the environment shown in FIG. 1 along with a number of planar layers, in accordance with the embodiment described herein.

As noted above, mapping data generated by a computing device can include a number of planar layers, where each of the planar layers includes two-dimensional data identified from the three-dimensional environmental data. The mapping data as well as the planar layers (alone or in combination) have a require less storage memory space than that of the three-dimensional environmental data. An example of a number of planar layers is depicted in FIG. 5. More specifically, FIG. 5 depicts a side view of the environment 100 from FIG. 1. The wall 112 is at the back of the depiction in FIG. 5 with the floor 110 at the bottom, the wall 114 on the right, the table 116 along the wall 112, and the shelves 118 along the wall 114. Also depicted in FIG. 5 are three horizontal dashed lines representing horizontal planes 160, 162, and 164. In the depicted embodiment, the planes 160, 162, and 164 have been selected based on features of the objects in the environment 100. In particular, the plane 160 has been selected to be at the level of a kick plate of the shelves 118, the plane 162 has been selected to be at the level of a top of the table 116, and the plane 164 has been selected to be at the level of a top of the shelves 118.

Figure 6A:
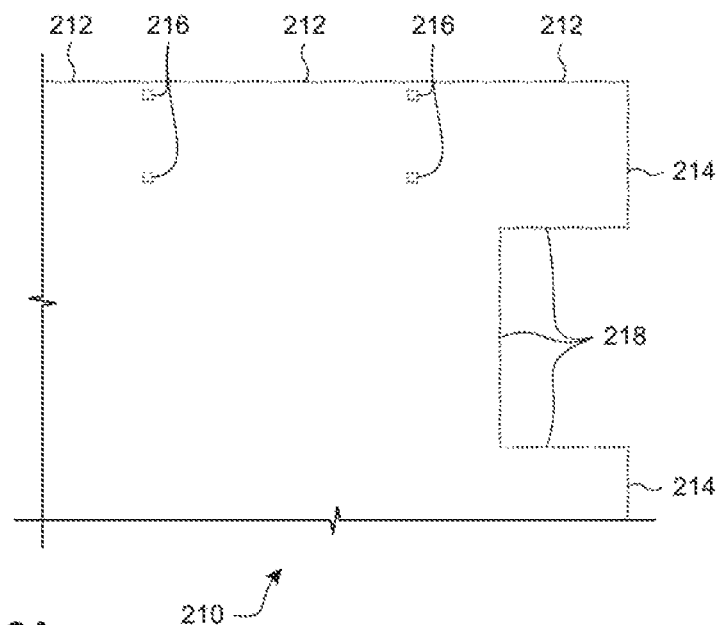
FIGS. 6A, 6B, and 6C depict respective representations of planar layers two-dimensional data associated with the planes shown in FIG. 5, in accordance with the embodiment described herein.
Figure 6B:
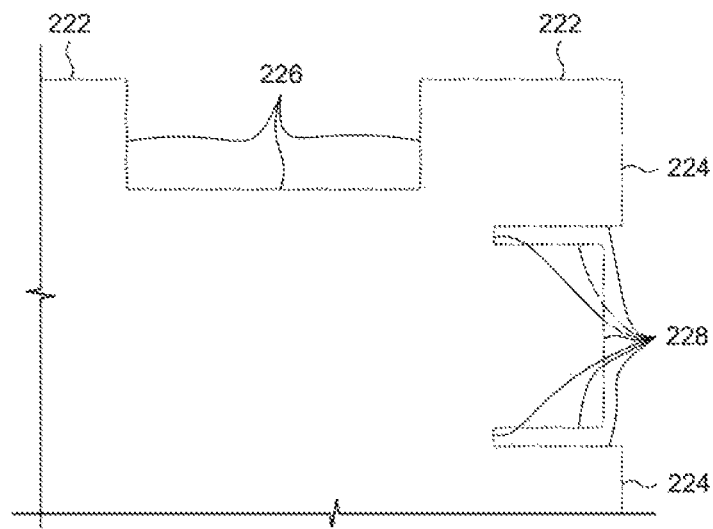
Figure 6C:
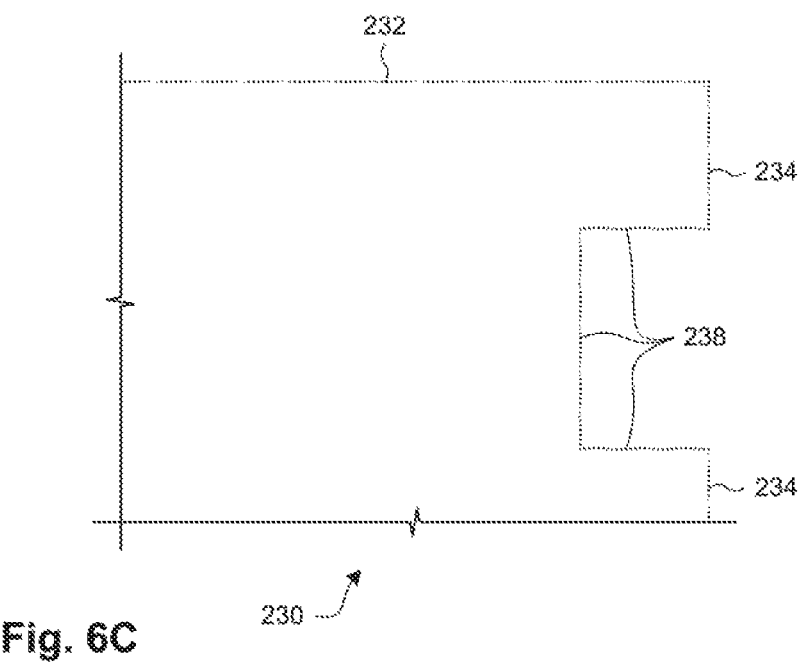

Depicted in FIGS. 6A, 6B, and 6C are respective representations of example planar layers 210, 220, and 230 of two-dimensional data associated with the planes 160, 162, and 164, respectively. Other planar layers (not shown here) may be similarly generated. More specifically, FIG. 6A depicts the planar layer 210 of two-dimensional data associated with the plane 160. The planar layer 210 includes point data identified from the three-dimensional environmental data 140 within the plane 160. The point data in the planar layer 210 includes point data 212 from the points of the three-dimensional environmental data 140 within the plane 160 that impinged on the wall 112. The point data in the planar layer 210 also includes point data 214 from the points of the three-dimensional environmental data 140 within the plane 160 that impinged on the wall 114. The point data in the planar layer 210 also includes point data 216 from the points of the three-dimensional environmental data 140 within the plane 160 that impinged on the table 116. In particular, the point data 216 is from the legs of the table 116. The point data in the planar layer 210 also includes point data 218 from the points of the three-dimensional environmental data 140 within the plane 160 that impinged on the shelves 118. In particular, the point data 218 is from the kick plate and the sides of the shelves 118.

FIG. 6B depicts the planar layer 220 of two-dimensional data associated with the plane 162. The planar layer 220 includes point data identified from the three-dimensional environmental data 140 within the plane 162. The point data in the planar layer 220 includes point data 222 from the points of the three-dimensional environmental data 140 within the plane 162 that impinged on the wall 112. The point data in the planar layer 220 also includes point data 224 from the points of the three-dimensional environmental data 140 within the plane 162 that impinged on the wall 114. The point data in the planar layer 220 also includes point data 226 from the points of the three-dimensional environmental data 140 within the plane 162 that impinged on the table 116. In particular, the point data 226 is from the sides of the top of the table 116. The point data in the planar layer 220 also includes point data 228 from the points of the three-dimensional environmental data 140 within the plane 162 that impinged on the shelves 118. In particular, the point data 228 is from the inside of one of the shelves and from the outside of the sides of the shelves 118.

FIG. 6C depicts the planar layer 230 of two-dimensional data associated with the plane 164. The planar layer 230 includes point data identified from the three-dimensional environmental data 140 within the plane 164. The point data in the planar layer 230 includes point data 232 from the points of the three-dimensional environmental data 140 within the plane 164 that impinged on the wall 112. The point data in the planar layer 230 also includes point data 234 from the points of the three-dimensional environmental data 140 within the plane 164 that impinged on the wall 114. The point data in the planar layer 230 also includes point data 238 from the points of the three-dimensional environmental data 140 within the plane 164 that impinged on the shelves 118. In particular, the point data 238 is from the sides of the top of the shelves 118. The planar layer 230 does not include any points of the three-dimensional environmental data 140 that impinged on the table 116 because, as can be seen in FIG. 5, the plane 164 is located above the table 116.

In some embodiments, the mapping data sent to the autonomous vehicle 120 includes one or more of the planar layers 210, 220, 230, or the like, selected based on one or more characteristics of the autonomous vehicle 120 and/or the environment 100. Examples of such characteristics of the autonomous vehicle 120 may include, without limitation, dimensions of the autonomous vehicle 120, location and/or operational range of various proximity or other types of sensors on the autonomous vehicle 120, position of one or more functional features of the autonomous vehicle 120 (e.g., sweeper, vacuum, etc.), or the like. Examples of characteristics of the environment 100 may include, without limitation, location of the objects, dimensions of the objects, or the like.

For example, if the height of the autonomous vehicle 120 is lower than the plane 164, the mapping data sent to the autonomous vehicle 120 may include the planar layers 210 and 220, but not the planar layer 230 because the information in the planar layer 230 may not affect the ability of the autonomous vehicle 120 to move through the environment 100. In another example, the mapping data sent to the autonomous vehicle 120 may include only the planar layer 210 because that planar layer represents the information that is closest to the floor 110 of the environment 100 and the functional feature (e.g., sweeper) is located closest to the floor 110. In yet another example, the planar layers to be included in the mapping data may be selected based on the location and range of a proximity sensor. For example, if the autonomous vehicle 120 includes a LIDAR sensor located at "x" inches from the ground that has a vertical scanning range of "y" inches, planar layers beyond the detection range (i.e., "x+y" inches in the vertical height direction) may not be included in the mapping data.

Similarly, if the location and/or size of an object in the environment 100 is such that the autonomous vehicle 120 cannot maneuver under the object, the system may not include two-dimensional layers corresponding to the object and instead create layers that makes the autonomous vehicle 120 navigate around the object.

As noted above, mapping data sent to an autonomous vehicle may include a planar layer of two-dimensional data that has point data identified from the three-dimensional environmental data. For such planar layers that include point data, the planar layer of two-dimensional data and the three-dimensional environmental data may have the same point data resolution. Having the same point data resolution in the planar layer of two-dimensional data as the three-dimensional environmental data may provide the autonomous vehicle with the highest possible resolution of mapping data. However, depending on the amount of point data in the planar layer, the amount of memory required by high resolution point data and the processing power required by the autonomous vehicle to process high resolution point data may not make it feasible for the planar layer to have the same point data resolution as the three-dimensional environmental data.

As such, in certain other embodiments, the planar layer of two-dimensional data may have a data point resolution that is less than that of the three-dimensional environmental data. The system may generate planar layers of two-dimensional data that have a data point resolution that is less than that of the three-dimensional environmental data by creating vector data or vectors from point data of the three-dimensional environmental data and/or planar layers that include point data, as described below with respect to FIGS. 7A, 7B, and 7C.

Figure 7A:
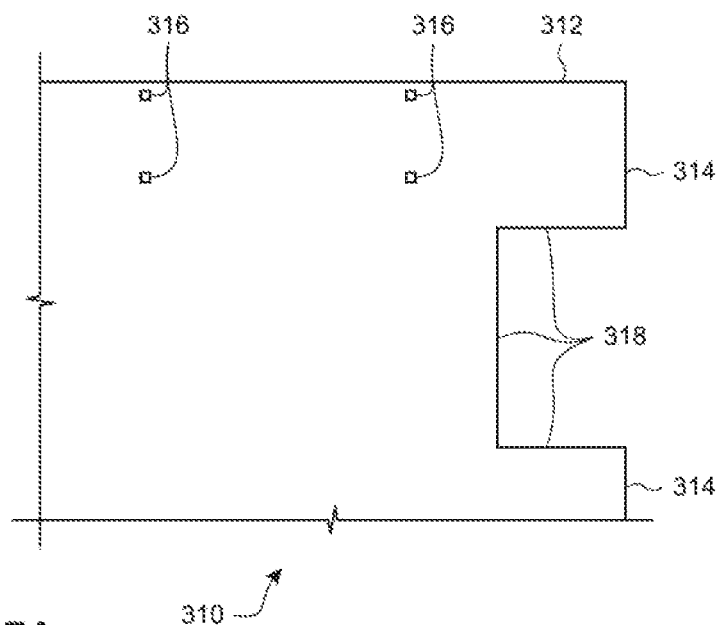
FIGS. 7A, 7B, and 7C depicts respective representations of planar layers of two-dimensional data, which are derived from the planar layers shown in FIGS. 6A, 6B, and 6C, respectively, and associated with the planes shown in FIG. 5, in accordance with the embodiment described herein.
Figure 7B:
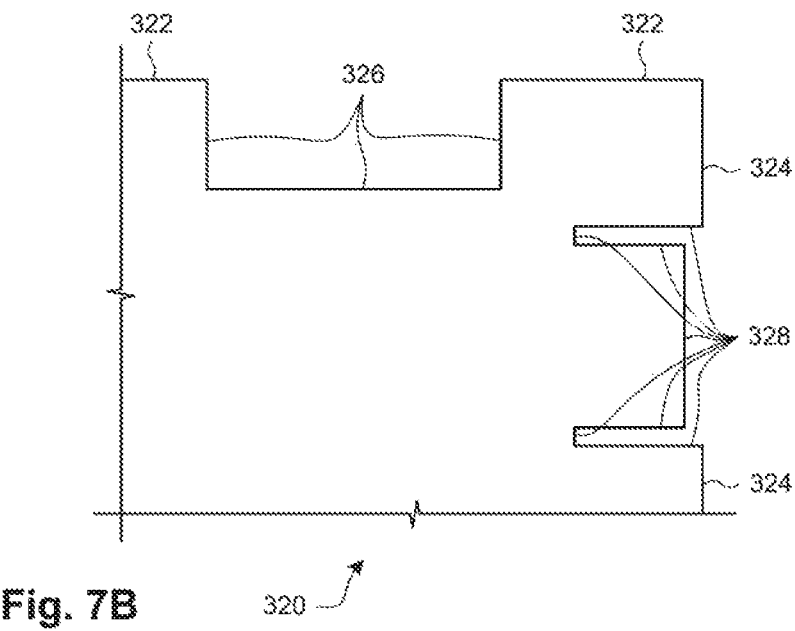
Figure 7C:
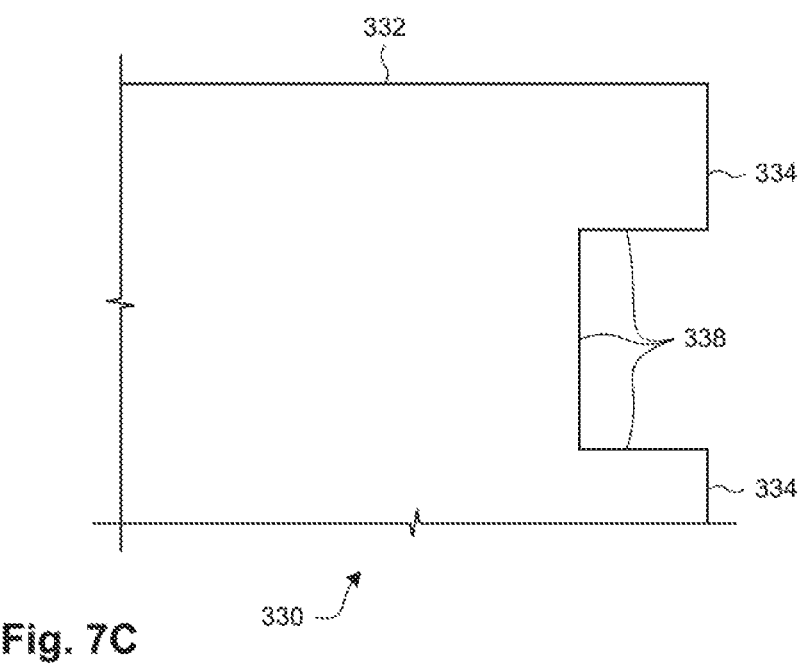

Depicted in FIGS. 7A, 7B, and 7C are respective representations of planar layers 310, 320, and 330 of two-dimensional data, which are derived from the planar layers 210, 220, and 230, respectively, and associated with the planes 160, 162, and 164, respectively. More specifically, the planar layers 310, 320, and 330 in FIGS. 7A, 7B, and 7C include vectors that approximate data points from the planar layers 210, 220, and 230. Other planar layers (not shown here) including vectors may be similarly generated. A vector can be defined in a number of ways. In one example, a vector can be defined by a starting point, a direction, and a magnitude. In another example, a vector can be defined by a starting point and an ending point. A vector can be defined in any other manner that represents a line. Each vector can take the place of any number of data points, such as tens of data points, hundreds of data points, or even greater numbers of data points. In this way, the size of the definition of the vector (e.g., the combination of a starting point, a direction, and a magnitude, or the combination of a starting point and an ending point) may be significantly smaller than the size of the definition of tens, hundred, or more of data points. Such vectors may be estimated or constructed from the corresponding sets of points included in the three-dimensional data using any now or hereafter known point cloud processing methods such as vector-based model reconstruction, automatic detection of geometric primetives, rastering, or the like.

FIG. 7A depicts the planar layer 310 of two-dimensional data, which is derived from the planar layer 210 and associated with the plane 160. The planar layer 310 includes a vector 312 that approximates a line of the point data 212 so that the vector 312 is an approximation of the wall 112 in the plane 160. The planar layer 310 also includes vectors 314 that approximate lines of the point data 214 so that the vectors 314 are approximations of portions of the wall 114 on either side of the shelves 118 in the plane 160. The planar layer 310 also includes vectors 316 that approximate lines of the point data 216 so that the vectors 316 are approximations of the sides of the legs of the table 116 in the plane 160. The planar layer 310 also includes vectors 318 that approximate lines of the point data 218 so that the vectors 318 are approximations of the kick plate and the sides of the shelves 118 in the plane 160.

FIG. 7B depicts the planar layer 320 of two-dimensional data, which is derived from the planar layer 220 and associated with the plane 162. The planar layer 320 includes vectors 322 that approximate lines of the point data 222 so that the vectors 322 are approximations of portions of the wall 112 on either side of the top of the table 116 in the plane 162. The planar layer 320 also includes vectors 324 that approximate lines of the point data 224 so that the vectors 324 are approximations of portions of the wall 114 on either side of the shelves 118 in the plane 162. The planar layer 320 also includes vectors 326 that approximate lines of the point data 226 so that the vectors 326 are approximations of the sides of the top of the table 116 in the plane 162. The planar layer 320 also includes vectors 328 that approximate lines of the point data 228 so that the vectors 328 are approximations of the inside and outside of the shelves 118 in the plane 162.

FIG. 7C depicts the planar layer 330 of two-dimensional data, which is derived from the planar layer 230 and associated with the plane 164. The planar layer 330 includes a vector 332 that approximates a line of the point data 232 so that the vector 332 is an approximation of the wall 112 in the plane 164. The planar layer 330 also includes vectors 334 that approximate lines of the point data 234 so that the vectors 334 are approximations of portions of the wall 114 on either side of the shelves 118 in the plane 164. The planar layer 330 also includes vectors 338 that approximate lines of the point data 238 so that the vectors 338 are approximations of the sides of the top of the shelves 118 in the plane 164. The planar layer 230 does not include any vectors that approximate the table 116 because, as can be seen in FIG. 5, the plane 164 is located above the table 116.

Each of the planar layers 310, 320, and 330 has a lower point data resolution than the corresponding planes 160, 162, and 164 of the three-dimensional environmental data 140 as well as the planar layers 210, 220, and 230, respectively. In an embodiment, the vectors in the planar layers 310, 320, and 330 can be identified by a computing device as part of generating the mapping data that is later sent to an autonomous vehicle. In one embodiment using the example of the system 270 and the method 250 depicted in FIG. 4, the mapping data generated by the computing device 274 at block 258 includes the planar layer 310. In this embodiment, method generation of the mapping data at block 258 include the computing device 274 identifying the vectors 312, 314, 316, and 328 from the three-dimensional environmental data received from the distance sensor 272 at block 256. Then, at block 260, the computing device 274 transmits the mapping data with the planar layer 310 to the autonomous vehicle 276.

In some embodiments, the mapping data sent to the autonomous vehicle 120 includes one or more of the planar layers 310, 320, and 330, or the like, selected based on one or more characteristics of the autonomous vehicle 120 and/or the environment 100 (as discussed above). Examples of such characteristics of the autonomous vehicle 120 may include, without limitation, dimensions of the autonomous vehicle 120, location and/or operational range of various proximity or other types of sensors on the autonomous vehicle 120, position of one or more functional features of the autonomous vehicle 120 (e.g., sweeper, vacuum, etc.), or the like. Examples of characteristics of the environment 100 may include, without limitation, location of the objects, dimensions of the objects, or the like. Examples of such characteristics may include, without limitation, dimensions of the autonomous vehicle 120, location and/or operational range of various proximity or other types of sensors on the autonomous vehicle 120, position of one or more functional features of the autonomous vehicle 120 (e.g., sweeper, vacuum, etc.), or the like.

For example, if the height of the autonomous vehicle 120 is lower than the plane 164, the mapping data sent to the autonomous vehicle 120 may include the planar layers 310 and 320, but not the planar layer 330 because the information in the planar layer 330 may not affect the ability of the autonomous vehicle 120 to move through the environment 100. In another example, the mapping data sent to the autonomous vehicle 120 may include only the planar layer 310 because that planar layer represents the information that is closest to the floor 110 of the environment 100 and the functional feature (e.g., sweeper) is located closest to the floor 110. In yet another example, the planar layers to be included in the mapping data may be selected based on the location and range of a proximity sensor. For example, if the autonomous vehicle 120 includes a LIDAR sensor located at "x" inches from the ground that has a vertical scanning range of "y" inches, planar layers beyond the detection range (i.e., "x+y" inches in the vertical height direction) may not be included in the mapping data.

Figure 8A:
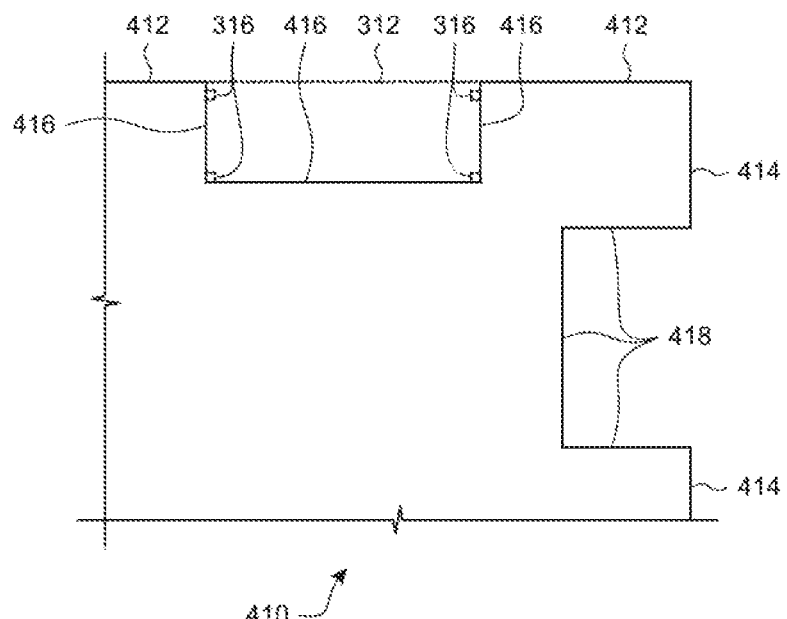
FIGS. 8A and 8B are planar layers that include vectors at a data point resolution that is lower than the data point resolution of the planar layers shown in FIGS. 7A and 7B, respectively, in accordance with the embodiment described herein.
Figure 8B:
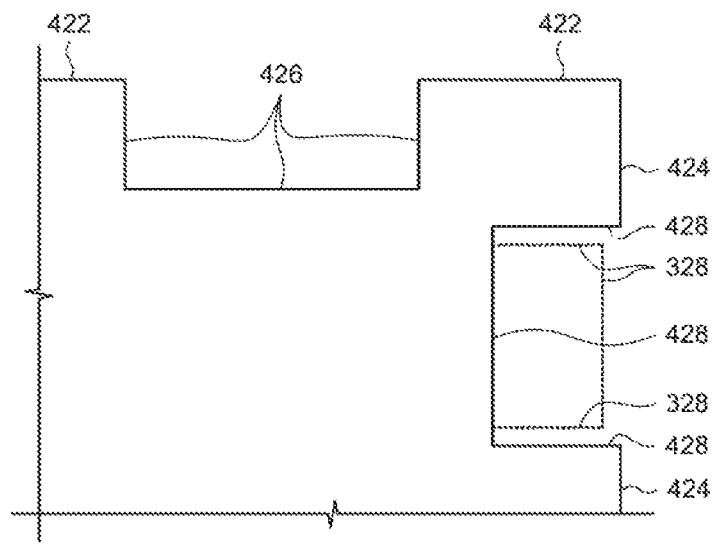
Figure 9A:
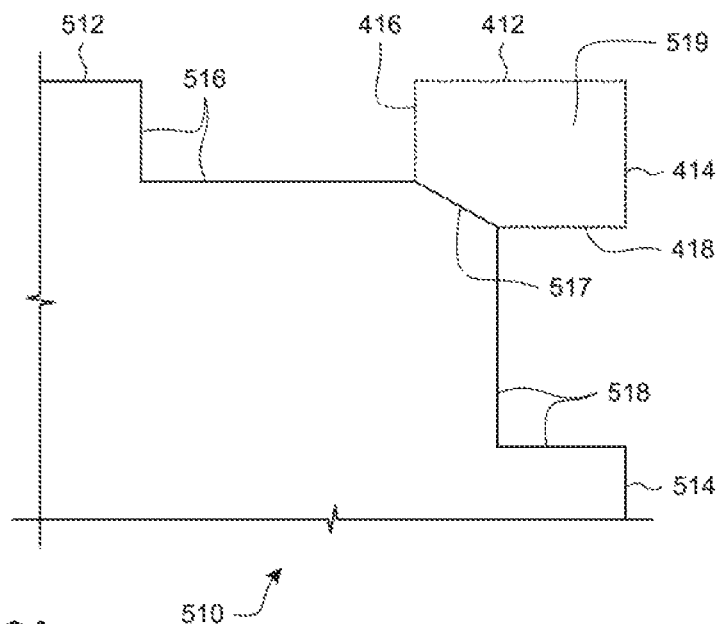
FIGS. 9A and 9B are planar layers that include vectors at a data point resolution that is lower than the data point resolution of the planar layers shown in FIGS. 8A and 8B, respectively, in accordance with the embodiment described herein.
Figure 9B:
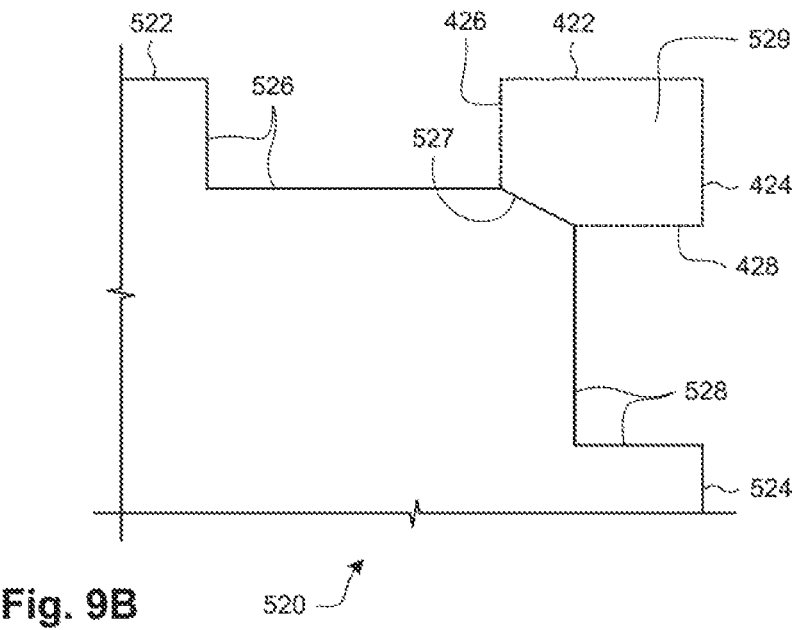

As noted above, the planar layers 310, 320, and 330 have a lower data point resolution than the corresponding planes 160, 162, and 164 of the three-dimensional environmental data 140. This lower data point resolution may further reduce the size of the mapping data sent to the autonomous vehicle 120 and/or the processing requirements of the autonomous vehicle 120 when navigating through the environment 100. In some embodiments, it may be advantageous to reduce the data point resolution even further beyond the data point resolution of the planar layers 310, 320, and 330. Depicted in FIGS. 8A and 8B are planar layers 410 and 420 that include vectors at a data point resolution that is lower than the data point resolution of the planar layers 310 and 320, respectively. Depicted in FIGS. 9A and 9B are planar layers 510 and 520 that include vectors at a data point resolution that is lower than the data point resolution of the planar layers 410 and 420, respectively.

FIG. 8A depicts the planar layer 410 of two-dimensional data, which is derived from the planar layer 210 and associated with the plane 160. The planar layer 410 includes vectors 412 that approximate lines of portions of the point data 212 so that the vectors 412 are approximations of portions of the wall 112 on either side of the table 116 in the plane 160. The vectors 412 cover some of the same locations as the vector 312 covers in the planar layer 310. The portion of the vector 312 not covered by the vectors 412 is depicted in FIG. 8A by a dashed line. The planar layer 410 also includes vectors 416 that extend from end points of the vectors 412 around the outer extents of the point data 216. In this way, the vectors 416 are approximations of the lines from the wall 112 around the outer extents of the legs of the table 116 in the plane 160. The vectors 416 cover some of the vectors 316 in the planar layer 310. The vectors 316 not covered by the vectors 416 are depicted in FIG. 8A by dashed lines. The planar layer 410 also includes vectors 414 and 418 that are the same as the vectors 314 and 318 in planar layer 310 and can be identified from the point data 214 and 218 in the same ways that vectors 314 and 318 in planar layer 310 were identified.

The planar layer 410 has a lower data point resolution than the planar layer 310 because the planar layer 410 has fewer vectors than the planar layer 310. More specifically, the planar layer 310 includes twenty two total vectors (one vector 312, two vectors 314, sixteen vectors 316, and three vectors 318) visible in FIG. 7A and the planar layer 410 includes ten total vectors (two vectors 412, two vectors 414, three vectors 416, and three vectors 418) visible in FIG. 8A. A computing device may include the planar layer 410 in the mapping data sent to the autonomous vehicle 120 instead of the planar layer 310 because the lower data point resolution of the planar layer 410 results in less memory and/or processing power required by the autonomous vehicle 120. Alternatively, the computing device may include the planar layer 410 in the mapping data sent to the autonomous vehicle 120 instead of the planar layer 310 because the computing device determines that the autonomous vehicle 120 should not attempt to maneuver between the legs of the table 116 (for example, if the dimensions of the autonomous vehicle 120 are not appropriate for such maneuver and/or if the sensors included in the autonomous vehicle 120 will not allow such maneuvering) and, therefore, the vectors 416 should be the boundaries of the area where the autonomous vehicle 120 can maneuver.

FIG. 8B depicts the planar layer 420 of two-dimensional data, which is derived from the planar layer 220 and associated with the plane 162. The planar layer 420 includes vectors 422, 424, and 426 that are the same as the vectors 322, 324, and 326 in planar layer 320 and can be identified from the point data 222, 224, and 226 in the same ways that vectors 322, 324, and 326 in planar layer 320 were identified. The planar layer 420 also includes vectors 428 that extend from end points of the vectors 424 around the outer extents of the point data 228. In this way, the vectors 428 are approximations of the outer extents of the shelves 118 from the wall 114 in the plane 162. The vectors 428 cover some of the vectors 328 in the planar layer 310. The vectors 328 not covered by the vectors 428 are depicted in FIG. 8B by dashed lines.

The planar layer 420 has a lower data point resolution than the planar layer 320 because the planar layer 420 has fewer vectors than the planar layer 320. More specifically, the planar layer 320 includes fourteen total vectors (two vectors 322, two vectors 324, three vectors 326, and seven vectors 328) visible in FIG. 7B and the planar layer 420 includes ten total vectors (two vectors 422, two vectors 424, three vectors 426, and three vectors 428) visible in FIG. 8B. A computing devices may include the planar layer 420 in the mapping data sent to the autonomous vehicle 120 instead of the planar layer 320 because the lower data point resolution of the planar layer 420 results in less memory and/or processing power required by the autonomous vehicle 120. Alternatively, the computing device may include the planar layer 420 in the mapping data sent to the autonomous vehicle 120 instead of the planar layer 320 because the computing device determines that the autonomous vehicle 120 should not attempt to maneuver inside of the interior of the shelves 118 and, therefore, the vectors 428 should be the boundaries of the area where the autonomous vehicle 120 can maneuver.

FIG. 9A depicts the planar layer 510 of two-dimensional data, which is derived from the planar layer 210 and associated with the plane 160. The planar layer 510 includes a vector 512 that is the same as one of the vectors 412, a vector 514 that is the same as one of the vectors 414, two vectors 516 that are the same as two of the vectors 416, and two vectors 518 that are the same as two of the vectors 418. The vectors 512, 514, 516, and 518 can be identified from the point data 212, 214, 216, and 218 in the same ways that vectors 412, 414, 416, and 418 in planar layer 410 were identified. The planar layer 510 also includes a vector 517 extending between an end of one of the vectors 516 to an end of one of the vectors 518. The vector 517 cuts off an area 519 that was bounded in part by some of the vectors 412, 414, 416, and 418 that are depicted by dashed lines in FIG. 9A.

The planar layer 510 has a lower data point resolution than the planar layer 410 because the planar layer 510 has fewer vectors than the planar layer 410. More specifically, the planar layer 410 includes ten total vectors (two vectors 412, two vectors 414, three vectors 416, and three vectors 418) visible in FIG. 8A and the planar layer 510 includes seven total vectors (one vector 512, one vector 514, two vectors 516, one vector 517, and two vectors 518) visible in FIG. 9A. A computing device may include the planar layer 510 in the mapping data sent to the autonomous vehicle 120 instead of the planar layer 410 because the computing device determines that the autonomous vehicle 120 should not attempt to maneuver in the area 519. This determination may be made because the autonomous vehicle 120 cannot fit between the table 116 and the shelves 118, because the autonomous vehicle 120 does not have enough room inside the area 519 to turn to exit the area after entering the area 519, or because of any other reason.

FIG. 10A depicts the planar layer 520 of two-dimensional data, which is derived from the planar layer 220 and associated with the plane 162. The planar layer 520 includes a vector 522 that is the same as one of the vectors 422, a vector 524 that is the same as one of the vectors 424, two vectors 526 that are the same as two of the vectors 426, and two vectors 528 that are the same as two of the vectors 428. The vectors 522, 524, 526, and 528 can be identified from the point data 222, 224, 226, and 228 in the same ways that vectors 422, 424, 426, and 428 in planar layer 420 were identified. The planar layer 520 also includes a vector 527 extending between an end of one of the vectors 526 to an end of one of the vectors 528. The vector 527 cuts off an area 529 that was bounded in part by some of the vectors 422, 424, 426, and 428 that are depicted by dashed lines in FIG. 9B.

The planar layer 520 has a lower data point resolution than the planar layer 420 because the planar layer 520 has fewer vectors than the planar layer 420. More specifically, the planar layer 420 includes ten total vectors (two vectors 422, two vectors 424, three vectors 426, and three vectors 428) visible in FIG. 8B and the planar layer 520 includes seven total vectors (one vector 522, one vector 524, two vectors 526, one vector 527, and two vectors 528) visible in FIG. 9B. A computing device may include the planar layer 520 in the mapping data sent to the autonomous vehicle 120 instead of the planar layer 420 because the computing device determines that the autonomous vehicle 120 should not attempt to maneuver in the area 529. This determination may be made because the autonomous vehicle 120 cannot fit between the table 116 and the shelves 118, because the autonomous vehicle 120 does not have enough room inside the area 529 to turn to exit the area after entering the area 529, or because of any other reason.

When a computing device is generating mapping data, such as in the example of block 258 in method 250, the computing device can generate the mapping data to include one or more planar layers identified from the three-dimensional environmental data based on one or more characteristics of the autonomous vehicle 120 and/or the environment 100. For example, the computing device can select one or more of the planar layers described herein (e.g., one or more of planar layers 210, 220, 230, 310, 320, 330, 410, 420, 510, or 520) or any variation of the planar layers described herein but not shown here. The determination of which planar layers to include in the mapping data may be made based on a number of factors relating to one or more characteristics of the autonomous vehicle and/or the environment. Examples of such factors may include, without limitation, the amount of memory available in the autonomous vehicle, the processing capability of the autonomous vehicle, dimensions of the autonomous vehicle, location of sensors on the autonomous vehicle, maneuverability of the autonomous vehicle, location of objects in the environment, dimensions of the objects, and any other factor. After generating the mapping data, the computing device can transmit the mapping data to the autonomous vehicle for use by the autonomous vehicle when navigating within the environment.

Figure 10:
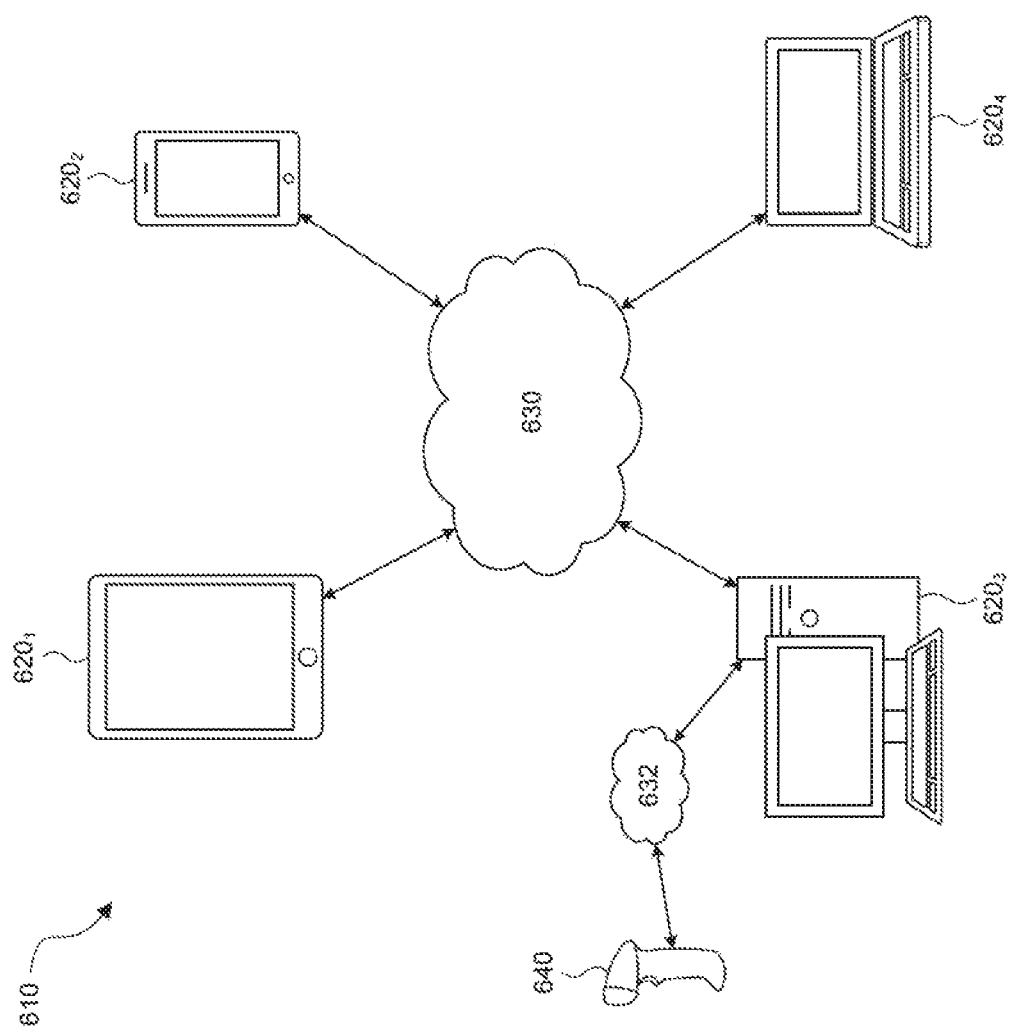
FIG. 10 depicts an example embodiment of a system that may be used to implement some or all of the embodiments described herein.

Various embodiments described herein include computing devices and/or systems that include computing devices. FIG. 10 depicts an example embodiment of a system 610 that may be used to implement some or all of the embodiments described herein. In the depicted embodiment, the system 610 includes computing devices $620_1$, $620_2$, $620_3$, and $620_4$ (collectively computing devices 620). In the depicted embodiment, the computing device $620_1$ is a tablet, the computing device $620_2$ is a mobile phone, the computing device $620_3$ is a desktop computer, and the computing device $620_4$ is a laptop computer. In other embodiments, the computing devices 620 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 620 are communicatively coupled to each other via one or more networks 630 and 632. Each of the networks 630 and 632 may include one or more wired or wireless networks (e.g., a 3G network, the Internet, an internal network, a proprietary network, a secured network). The computing devices 620 are capable of communicating with each other and/or any other computing devices via one or more wired or wireless networks. While the particular system 610 in FIG. 10 depicts that the computing devices 620 communicatively coupled via the network 630 include four computing devices, any number of computing devices may be communicatively coupled via the network 630.

In the depicted embodiment, the computing device $620_3$ is communicatively coupled with a peripheral device 640 via the network 632. In the depicted embodiment, the peripheral device 640 is a scanner, such as a barcode scanner, an optical scanner, a computer vision device, and the like. In some embodiments, the network 632 is a wired network (e.g., a direct wired connection between the peripheral device 640 and the computing device $620_3$), a wireless network (e.g., a Bluetooth connection or a WiFi connection), or a combination of wired and wireless networks (e.g., a Bluetooth connection between the peripheral device 640 and a cradle of the peripheral device 640 and a wired connection between the peripheral device 640 and the computing device $620_3$). In some embodiments, the peripheral device 640 is itself a computing device (sometimes called a "smart" device). In other embodiments, the peripheral device 640 is not a computing device (sometimes called a "dumb" device).

Figure 11:
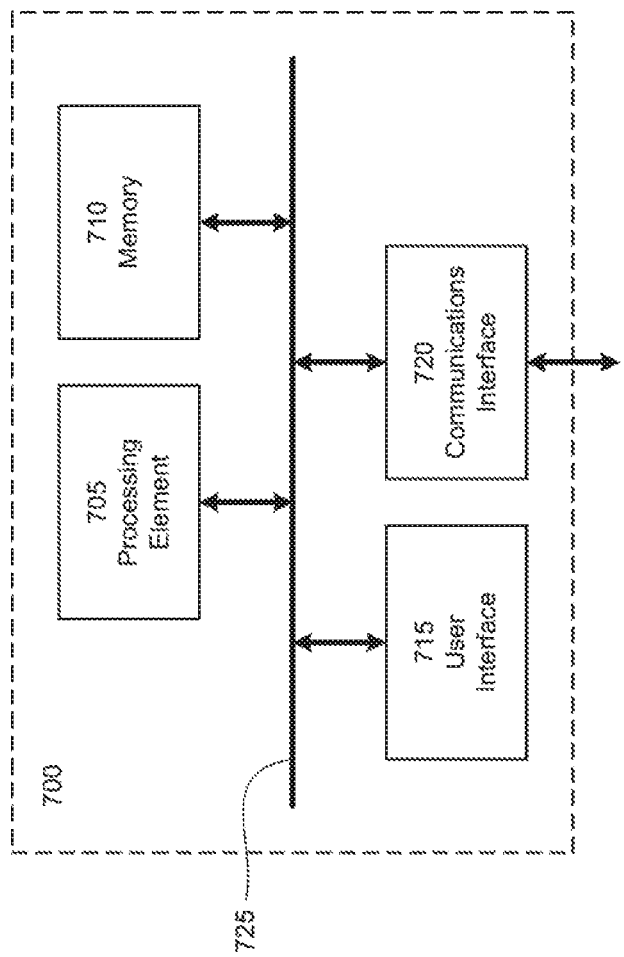
FIG. 11 depicts a block diagram of an embodiment of a computing device, in accordance with the embodiments described herein.

Depicted in FIG. 11 is a block diagram of an embodiment of a computing device 700. Any of the computing devices 620 and/or any other computing device described herein may include some or all of the components and features of the computing device 700. In some embodiments, the computing device 700 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID)

tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 700 includes a processing element 705, memory 710, a user interface 715, and a communications interface 720. The processing element 705, memory 710, a user interface 715, and a communications interface 720 are capable of communicating via a communication bus 725 by reading data from and/or writing data to the communication bus 725. The computing device 700 may include other components that are capable of communicating via the communication bus 725. In other embodiments, the computing device does not include the communication bus 725 and the components of the computing device 700 are capable of communicating with each other in some other way.

The processing element 705 (also referred to as one or more processors, processing circuitry, and/or similar terms used herein) is capable of performing operations on some external data source. For example, the processing element may perform operations on data in the memory 710, data receives via the user interface 715, and/or data received via the communications interface 720. As will be understood, the processing element 705 may be embodied in a number of different ways. In some embodiments, the processing element 705 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 705 is configured for a particular use or configured to execute instructions stored in volatile or nonvolatile media or otherwise accessible to the processing element 705. As such, whether configured by hardware or computer program products, or by a combination thereof, the processing element 705 may be capable of performing steps or operations when configured accordingly.

The memory 710 in the computing device 700 is configured to store data, computer-executable instructions, and/or any other information. In some embodiments, the memory 710 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 710 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 715 of the computing device 700 is in communication with one or more input or output devices that are capable of receiving inputs into and/or outputting any outputs from the computing device 700. Embodiments of input devices include a keyboard, a mouse, a touchscreen display, a touch sensitive pad, a motion input device, movement input device, an audio input, a pointing device input, a joystick input, a keypad input, peripheral device 640, foot switch, and the like. Embodiments of output devices include an audio output device, a video output, a display device, a motion output device, a movement output device, a printing device, and the like. In some embodiments, the user interface 715 includes hardware that is configured to communicate with one or more input devices and/or output devices via wired and/or wireless connections.

The communications interface 720 is capable of communicating with various computing devices and/or networks. In some embodiments, the communications interface 720 is capable of communicating data, content, and/or any other information, that can be transmitted, received, operated on, processed, displayed, stored, and the like. Communication via the communications interface 720 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol Similarly, communication via the communications interface 720 may be executed using a wireless data transmission protocol, such as general packet radio service (GPRS), Universal Mobile Telecommunications System (UMTS), Code Division Multiple Access 2000 (CDMA2000), CDMA2000 1x(1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 700 may be located remotely from other components of the computing device 700 components, such as in a distributed system. Furthermore, one or more of the components may be combined and additional components performing functions described herein may be included in the computing device 700. Thus, the computing device 700 can be adapted to accommodate a variety of needs and circumstances. The depicted and described architectures and descriptions are provided for exemplary purposes only and are not limiting to the various embodiments described herein.

The following U.S. patent documents are fully incorporated into this patent document by reference: (1) U.S. Pat. No. 8,958,937, titled "Cleaning Machine with Collision Prevention"; (2) U.S. Pat. No. 8,679,260, titled "Method and System for Movement of an Automatic Cleaning Device using Video Signal"; (3) U.S. Pat. No. 8,532,860, titled "Method and System for Automatic Yield to High Priority Traffic"; and (4) U.S. Pat. No. 8,423,225, titled Method and System for Movement of Robotic Device using Video Signal.

It will be appreciated that the above-disclosed and other features and functions may be combined into many other different systems or applications. All such applications and alternatives are also intended to be encompassed by the disclosure of this patent document.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A method comprising, by a processor:
   obtaining, using a distance sensor, three-dimensional environmental data of an environment, the three-dimensional environmental data including information relating to one or more objects in the environment;
   identifying at least one planar layer of two-dimensional data from the three-dimensional environmental data to be included in mapping data based on one or more characteristics of an autonomous vehicle;
   generating, from the three-dimensional environmental data, mapping data comprising the at least one planar layer of two-dimensional data, wherein the mapping data comprises a plurality of planar layers, each of the plurality of planar layers comprising two-dimensional data identified from the three-dimensional data, wherein one or more of the plurality of planar layers has a data point resolution that is lower than a data point resolution of a corresponding plane of the three-dimensional environmental data; and
   transmitting the mapping data to the autonomous vehicle for use during operation within the environment.

2. The method of claim 1, wherein the one or characteristics of the autonomous vehicle include at least one of the following characteristics: dimensions of the autonomous vehicle, location of one or more sensors on the autonomous vehicle, operational range of the one or more sensors in the autonomous vehicle, amount of memory available in the autonomous vehicle, processing capability of the autonomous vehicle, positions of one or more functional features of autonomous vehicles, or maneuverability of the autonomous vehicle.

3. The method of claim 1, wherein identifying the at least one planar layer of two-dimensional data from the three-dimensional environmental data to be included in mapping data further comprises identifying the at least one planar layer of two-dimensional data based on one or more characteristics of the environment.

4. The method of claim 3, wherein the one or characteristics of the environment include at least one of the following characteristics: location of one or more objects in the environment, or dimensions of one or more objects in the environment.

5. The method of claim 1, wherein the autonomous vehicle is a robotic device.

6. The method of claim 1, further comprising causing operation of the autonomous vehicle in the environment, wherein the autonomous vehicle is configured to operate within the environment based at least in part on the mapping data received by the autonomous vehicle.

7. The method of claim 1, wherein the at least one planar layer of two-dimensional data has a data point resolution that is the same as a data point resolution of a corresponding plane of the three-dimensional environmental data.

8. The method of claim 1, wherein the at least one planar layer of two-dimensional data has a data point resolution that is lower than a data point resolution of a corresponding plane of the three-dimensional environmental data.

9. The method of claim 8, wherein the data point resolution of the at least one planar layer is reduced by creating a plurality of vectors from point data included in the three-dimensional environmental data.

10. The method of claim 1, wherein the autonomous vehicle is at a location other than the environment when the mapping data is transmitted to the autonomous vehicle.

11. A system for generating mapping data for an autonomous vehicle, the system comprising:
    a distance sensor;
    an autonomous vehicle;
    a processor in communication with the distance sensor and the autonomous vehicle; and
    a non-transitory, computer-readable memory containing programming instructions that are configured to cause the processor to:
    obtain, from the distance sensor, three-dimensional environmental data of an environment, the three-dimensional environmental data including information relating to one or more objects in the environment,
    identify at least one planar layer of two-dimensional data from the three-dimensional environmental data to be included in mapping data based on one or more characteristics of an autonomous vehicle,
    generating, from the three-dimensional environmental data, mapping data comprising the at least one planar layer of two-dimensional data, wherein the mapping data comprises a plurality of planar layers, each of the plurality of planar layers comprising two-dimensional data identified from the three-dimensional environmental data, and wherein one or more of the plurality of planar layers has a data point resolution that is lower than a data point resolution of a corresponding plane of the three-dimensional environmental data, and
    transmitting the mapping data to the autonomous vehicle for use during operation within the environment.

12. The system of claim 11, wherein the one or characteristics of the autonomous vehicle include at least one of the following characteristics: dimensions of the autonomous vehicle, location of one or more sensors on the autonomous vehicle, operational range of the one or more sensors in the autonomous vehicle, amount of memory available in the autonomous vehicle, processing capability of the autonomous vehicle, positions of one or more functional features of autonomous vehicles, or maneuverability of the autonomous vehicle.

13. The system of claim 11, wherein the instructions that cause the processor to identify the at least one planar layer of two-dimensional data from the three-dimensional environmental data to be included in mapping data further comprise one or more instructions to cause the processor to identify the at least one planar layer of two-dimensional data based on one or more characteristics of the environment.

14. The system of claim 11, wherein the one or characteristics of the environment include at least one of the following characteristics: location of one or more objects in the environment, or dimensions of one or more objects in the environment.

15. The system of claim 11, wherein the autonomous vehicle is a robotic device.

16. The system of claim 11, wherein the at least one planar layer of two-dimensional data has a data point resolution that is the same as a data point resolution of a corresponding plane of the three-dimensional environmental data.

17. The system of claim 11, wherein the at least one planar layer of two-dimensional data has a data point resolution that is lower than a data point resolution of a corresponding plane of the three-dimensional environmental data.

18. The system of claim 17, wherein the data point resolution of the at least one planar layer is reduced by creating a plurality of vectors from point data included in the three-dimensional environmental data.

19. The system of claim 11, wherein the autonomous vehicle is at a location other than the environment when the mapping data is transmitted to the autonomous vehicle.

20. A non-transitory, computer-readable medium containing programming instructions that are configured to cause a processing device to:

obtain, from a distance sensor, three-dimensional environmental data of an environment, the three-dimensional environmental data including information relating to one or more objects in the environment;

identify at least one planar layer of two-dimensional data from the three-dimensional environmental data to be included in mapping data based on one or more characteristics of an autonomous vehicle;

generating, from the three-dimensional environmental data, mapping data comprising the at least one planar layer of two-dimensional data, wherein the mapping data comprises a plurality of planar layers, each of the plurality of planar layers comprising two-dimensional data identified from the three-dimensional environmental data, and wherein one or more of the plurality of planar layers has a data point resolution that is lower than a data point resolution of a corresponding plane of the three-dimensional environmental data; and transmitting the mapping data to the autonomous vehicle for use during operation within the environment.

21. The non-transitory, computer-readable medium of claim 20, wherein the one or characteristics of the autonomous vehicle include at least one of the following characteristics:

dimensions of the autonomous vehicle, location of one or more sensors on the autonomous vehicle, operational range of the one or more sensors in the autonomous vehicle, amount of memory available in the autonomous vehicle, processing capability of the autonomous vehicle, positions of one or more functional features of autonomous vehicles, or maneuverability of the autonomous vehicle.

22. The non-transitory, computer-readable medium of claim 20, wherein the instructions that cause the processing device to identify the at least one planar layer of two-dimensional data from the three-dimensional environmental data to be included in mapping data further comprise one or more instructions to cause the processing device to identify the at least one planar layer of two-dimensional data based on one or more characteristics of the environment.

23. The non-transitory, computer-readable medium of claim 20, wherein the one or characteristics of the environment include at least one of the following characteristics: location of one or more objects in the environment, or dimensions of one or more objects in the environment.

24. The non-transitory, computer-readable medium of claim 20, wherein the autonomous vehicle is a robotic device.

* * * * *